(12) United States Patent
Merwe et al.

(10) Patent No.: US 8,566,653 B2
(45) Date of Patent: Oct. 22, 2013

(54) INFRASTRUCTURE FOR RAPID SERVICE DEPLOYMENT

(75) Inventors: Jacobus Van Der Merwe, New Providence, NJ (US); Xu Chen, Ann Arbor, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 768 days.

(21) Appl. No.: 12/644,879

(22) Filed: Dec. 22, 2009

(65) Prior Publication Data

US 2011/0154101 A1    Jun. 23, 2011

(51) Int. Cl.
*G06F 11/00* (2006.01)

(52) U.S. Cl.
USPC .............................. 714/57; 714/4.5; 715/736

(58) Field of Classification Search
USPC .................................. 714/4.1, 46, 57; 715/736
See application file for complete search history.

(56) References Cited

U.S. PATENT DOCUMENTS

| | | | |
|---|---|---|---|
| 6,255,943 B1 * | 7/2001 | Lewis et al. .................. 340/506 |
| 7,562,254 B2 * | 7/2009 | Davis et al. ...................... 714/16 |
| 7,627,787 B1 * | 12/2009 | Johnson et al. ................. 714/43 |
| 7,796,039 B2 * | 9/2010 | Brillhart et al. ............. 340/572.1 |
| 7,971,106 B2 * | 6/2011 | Lovy et al. ...................... 714/57 |
| 2004/0030712 A1 * | 2/2004 | Sano et al. ..................... 707/102 |
| 2008/0201642 A1 * | 8/2008 | Chong et al. .................. 715/736 |
| 2008/0307259 A1 * | 12/2008 | Vasudevan et al. ............. 714/23 |
| 2009/0006909 A1 * | 1/2009 | Ladd et al. ..................... 714/57 |
| 2009/0013222 A1 * | 1/2009 | Di Luoffo et al. .............. 714/57 |
| 2009/0055693 A1 * | 2/2009 | Budko et al. ................... 714/57 |
| 2010/0011298 A1 * | 1/2010 | Campbell et al. ............. 715/736 |
| 2010/0077310 A1 * | 3/2010 | Karachale et al. ............ 715/736 |
| 2011/0072312 A1 * | 3/2011 | Fan et al. ....................... 714/46 |
| 2011/0131499 A1 * | 6/2011 | Ferris et al. ................... 715/736 |

OTHER PUBLICATIONS

Xu Chen et al. "ShadowNet: A Platform for Rapid and safe Network Evolution", downloaded from www2.research.att.com/~kobus/docs/shadownet.pdf no later than Mar. 22, 2010.

* cited by examiner

*Primary Examiner* — Joshua Lohn
(74) *Attorney, Agent, or Firm* — Greenblum & Bernstein, P.L.C.

(57) ABSTRACT

A controller is used to provide a sharable, programmable and composable infrastructure. The controller includes a user manager to take input of user application programming interface calls that correspond to actions accepted from users. A physical manager fulfills requests from the user manager by manipulating distributed physical resources and logical devices in a network controlled by the controller. A configuration effector implements configuration changes to the physical resources and logical devices. A device monitor determines a status of the physical resources and logical devices, propagates the status to the physical manager for detecting a failure of the physical resources and logical devices in real-time, and mitigates the failure.

20 Claims, 13 Drawing Sheets

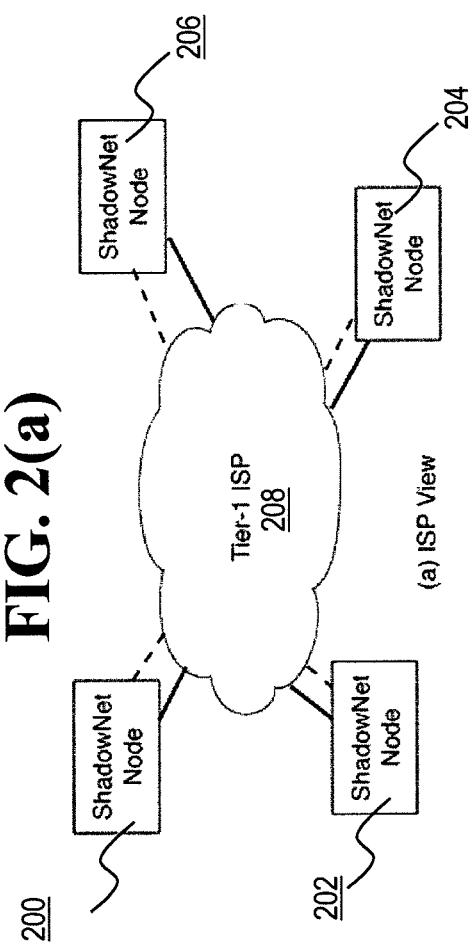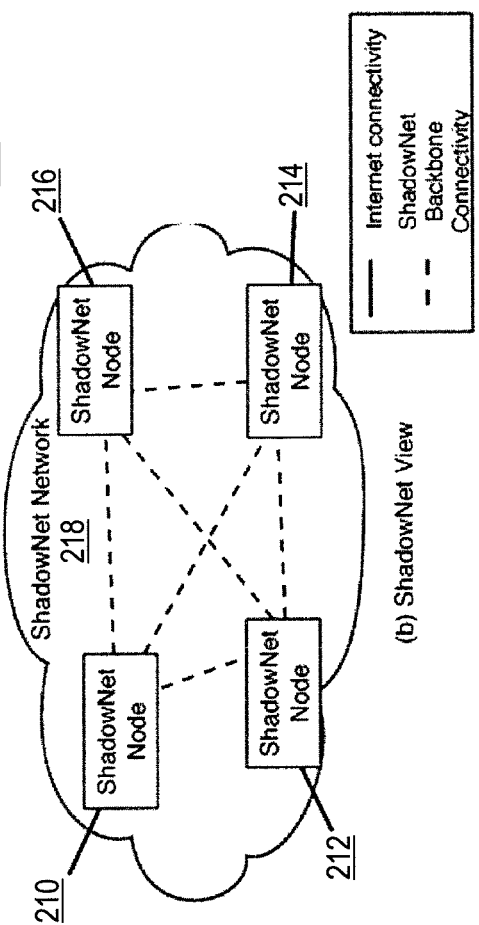

INFRASTRUCTURE FOR RAPID SERVICE DEPLOYMENT

BACKGROUND

1. Field of the Disclosure

The present disclosure relates to the field of computer networks. More particularly, the present disclosure relates to a sharable, programmable and composable infrastructure, consisting of carrier-grade equipment.

2. Background Information

New network services, service features and operational tools, are deployed by service providers from time to time. Modern networks are, however, used to provide a variety of services, while changes may be implemented at any time for fewer than all services provided using a network. There are primarily three drivers for changes in modern service provider networks. First, growth demands are fueled by an increase in broadband subscribers and media rich content, and traffic volumes on the Internet continue to show double digit growth rates year after year. Second, customers continually demand new and better service offerings, from application-level services like Voice Over Internet protocol ("VoIP") and Internet Protocol Television ("IPTV"), connectivity services like Virtual Private Network ("VPN") and IPv4/IPv6 transport, traffic management services like Denial of Service ("DDoS") mitigation or Content Distribution Networks ("CDNs"), or more mundane service features like the ability to signal routing preferences to the provider or load balancing features. Third, growing demands on operational procedures result from increasing use of IP networks for business critical applications. As an example of the third driver, end-user applications are often very intolerant of even the smallest network disruption, leading to the deployment of methods to decrease routing convergence in the event of network failures. Similarly, availability expectations, in turn driven by higher level business needs, make regularly planned maintenance events problematic, leading to the development of sophisticated operational methods to limit the impact of such maintenance.

For any network change, especially for new services and service features, corresponding changes may be made to a variety of operational support systems. Additionally, the introduction of new services or service features typically involves long deployment cycles. For example, configuration changes to network equipment are lab-tested before staged deployments are performed in an attempt to reduce the potential of any negative impact on existing services. However, testing in a lab environment is difficult due to the challenge of artificially recreating realistic network conditions in a lab setting.

BRIEF DESCRIPTION OF THE DRAWINGS

FIG. 2(a) shows a ShadowNet network topology from the viewpoint of a tier-1 provider, according to an aspect of the present disclosure;

FIG. 2(b), shows connectivity between ShadowNet nodes, effectively creating an overlay network to form a virtual backbone among the ShadowNet nodes, according to an aspect of the present disclosure;

DETAILED DESCRIPTION

Figure 1:
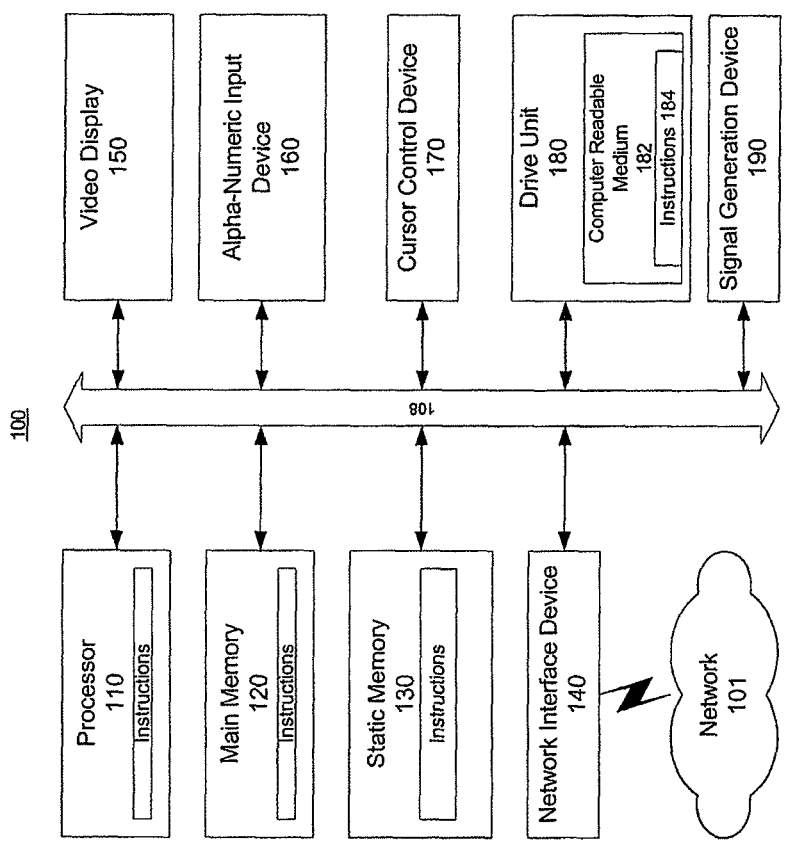
FIG. 1 shows an exemplary general computer system that includes a set of instructions for providing a sharable, programmable and composable network infrastructure.

In view of the foregoing, the present disclosure, through one or more of its various aspects, embodiments and/or specific features or sub-components, is thus intended to bring out one or more of the advantages as specifically noted below.

According to the present disclosure, a controller provides a sharable, programmable and composable infrastructure. The controller may comprise a user manager to take input of user application programming interface calls that correspond to actions accepted from users. The controller may also comprise a physical manager to fulfill requests from the user manager by manipulating distributed physical resources and logical devices in a network controlled by the controller. The controller may further comprise a configuration effector to implement configuration changes to the physical resources and logical devices. The controller may additionally comprise a device monitor to determine a status of the physical resources and logical devices, propagate the status to the physical manager for detecting a failure of the physical resources and logical devices in real-time, and mitigate the failure.

A method provides a sharable, programmable and composable infrastructure using a controller. The method may comprise taking input, at a user manager, of user application programming interface calls that correspond to actions accepted from users. The method may further comprise fulfilling requests, at a physical manager, from the user manager, by manipulating distributed physical resources and logical devices in a network controlled by the controller. The method may also comprise implementing configuration changes, at a configuration effector, to implement configuration changes to the physical resources and logical devices. The method may further comprise determining, at a device monitor, a status of the physical resources and logical devices, propagating the status to the physical manager for detecting a failure of the physical resources and logical devices in real-time, and mitigating the failure.

A computer readable medium provides a sharable, programmable and composable infrastructure using a controller. The computer readable medium may comprise an input taking code segment that takes input, at a user manager, user application programming interface calls that correspond to actions accepted from users. The computer readable medium may also comprise a request fulfilling code segment that fulfills requests, at a physical manager, from the user manager by manipulating distributed physical resources and logical devices in a network controlled by a controller. The computer readable medium may additionally comprise a change implementing code segment that implements configuration changes, at a configuration effector, to the physical resources and logical devices. The computer readable medium may comprise may further comprise a determining code segment that determines, at a device monitor, a status of the physical resources and logical devices, propagates the status to the physical manager for detecting a failure of the physical resources and logical devices in real-time, and mitigates the failure.

This disclosure introduces a platform called ShadowNet, which may be used to exploit the strong separation provided by modern computing and network equipment between logical functionality and physical infrastructure. ShadowNet may allow logical topologies of computing servers, network equipment and links to be dynamically created, and then instantiated to and managed on the physical infrastructure. ShadowNet is a sharable, programmable and composable infrastructure, which may consist of carrier-grade equipment. ShadowNet is a fully operational network that may be connected to, but remain functionally separate from the provider production network. By exploiting the strong separation support, ShadowNet may allow multiple technology and service trials to be executed in parallel in a realistic operational setting, without impacting the production network. The present disclosure describes the ShadowNet architecture as well as the control framework designed for its operation, and illustrates the utility of the platform. The disclosure also presents a prototype implementation and demonstrates the effectiveness of the platform through extensive evaluation.

ShadowNet is an operational trial/test network consisting of ShadowNet nodes which may be distributed throughout the backbone of a tier-1 provider. Each ShadowNet node may be composed of a collection of carrier-grade equipment, such as for example routers, switches and servers. Each node may in turn be connected to the Internet as well as to other ShadowNet nodes via a virtual backbone.

ShadowNet provides a sharable, programmable and composable infrastructure to enable the rapid trial or deployment of new network services or service features, or evaluation of new network management tools in a realistic operational network environment. Specifically, via the Internet connectivity of each ShadowNet node, traffic from arbitrary end-points can reach ShadowNet. ShadowNet connects to and interacts with the provider backbone much like a customer network would. As such, the provider backbone may be isolated from the testing and experimentation that can take place within ShadowNet. In the first instance, ShadowNet is capable of providing the means for testing services and procedures for subsequent deployment in a separate production network. However, it is also anticipated that ShadowNet functionality will be provided by the production network itself to directly enable rapid yet safe service deployment.

ShadowNet utilizes virtualization and/or partitioning capabilities of equipment to enable platform sharing between different, concurrently running trials/experiments. The equipment in ShadowNet nodes is programmable to enable experimentation and the introduction of new functionality. ShadowNet allows the dynamic composition of test/trial topologies.

The functionality disclosed herein is provided in an operational network on carrier-grade equipment to enable a rapid service deployment/evaluation platform in which technology or service trials performed in ShadowNet closely mimic the technology used in the provider network.

One aspect of the control framework is that the control framework provides a clean separation between the physical-level equipment in the testbed and the user-level slice specifications that can be constructed within a physical platform. A slice, which encapsulates a service trial, is essentially a container of the service design, including device connectivity and placement specification. Once instantiated, a slice also contains the physical resources allocated to the service trial. Despite this clean separation, the partitioning capabilities of the underlying hardware allow virtualized equipment to be largely indistinguishable from the physical counterparts of this equipment, except that the virtualized equipment contains fewer resources. The ShadowNet control framework provides a set of interfaces allowing users to programmatically interact with the platform to manage and manipulate the users' slices.

The present disclosure presents a network control framework that allows users to manipulate the users' slices and/or the physical resource contained therein with a simple interface. The present disclosure additionally describes physical-level realizations of user-level slice specifications using carrier-grade equipment and network services/capabilities. The present disclosure further presents a prototype implementation and evaluation of the presently-disclosed architecture.

In embodiments, ShadowNet may serve as a platform for rapid and safe network change. In yet further embodiments, ShadowNet may also allow for the rapid composition of distributed computing and networking resources. Such computing and networking resources may further be contained in a slice and realized in carrier-grade facilities, and may be utilized to introduce and test new services or network management tools. The ShadowNet control framework allows the network-wide resources that make up each slice to be managed either collectively or individually.

In the first instance, ShadowNet limits new services to the set of resources allocated, i.e., to those contained in a slice. Limiting new services in this way would be a sufficient solution for testing and trying out new services in a realistic environment before introducing such services into a production network. Longer term, however, the base functionality provided by ShadowNet may be used in the production network and allow resources and functionality from different slices to be gracefully merged under the control of the ShadowNet control framework.

The present disclosure describes the ShadowNet architecture and how the ShadowNet architecture can be used to realize a sophisticated service. Further, the present disclosure compares ShadowNet with several experimental network platforms, and shows that ShadowNet is unique in terms of its ability to provide realistic network testing. Finally, the present disclosure describes the architecture of the ShadowNet controller.

As discussed earlier, new operational solutions are increasingly more sophisticated and automated. ShadowNet may provide the means for safely testing such functionality in a realistic environment. ShadowNet enables the development of mechanisms and network management primitives that would allow new services and operational tools to be safely deployed directly in production networks.

FIG. 1 is an illustrative embodiment of a general computer system 100 of a type on which the architecture for rapid service deployment can be implemented. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

FIGS. 2(a) and 2(b) show different viewpoints of the ShadowNet network architecture. FIG. 2(a) shows the topology from the viewpoint of a tier-1 Internet Service Provider ("ISP") 208. ShadowNet nodes connect to the provider network, but are essentially separate from it. Each ShadowNet node 200-206 has connectivity to other ShadowNet nodes 200-206 as well as connectivity to the Internet. As shown in FIG. 2(b), connectivity to other ShadowNet nodes 210-216 effectively creates an overlay network to form a virtual backbone among the nodes. Via the provided Internet connectivity, the ShadowNet address space is advertised, e.g., using Border Gateway Protocol ("BGP"), first to the provider network and then to the rest of the Internet. Thus ShadowNet effectively becomes a small provider network itself, i.e., a shadow of the provider network, represented in FIG. 2(b) as ShadowNet Network 118.

Figure 3:
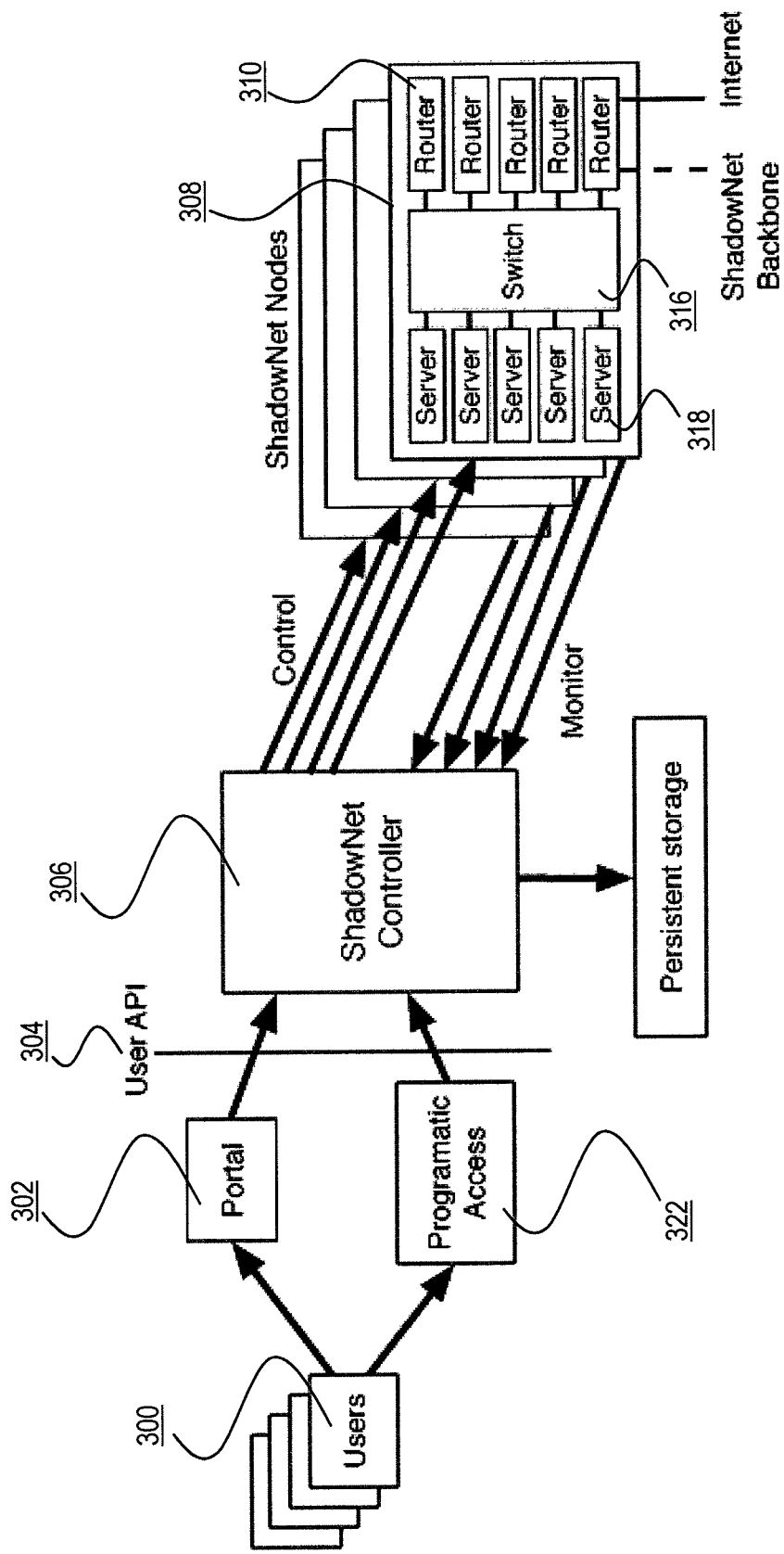
FIG. 3 shows a ShadowNet functional architecture, according to an aspect of the present disclosure.

FIG. 3 illustrates the ShadowNet functional architecture, including users 300, portal 302, User API 304, a ShadowNet Controller 306, ShadowNet Nodes 308, Persistent Storage, and Programmatic Access 322. Each ShadowNet node 308 contains different types of computing and networking devices, such as servers 318, routers 310, and switches 316. Combined with the network connectivity received from the ISP, they complete the physical resource for ShadowNet. ShadowNet manages the physical resources and enables its users to share them. The devices provide virtualization/partitioning capabilities so that multiple logical devices can share the same underlying physical resource. For example, modern routers allow router resources to be partitioned so that several logical routers can be configured to run simultaneously and separately on a single physical router. Those having ordinary skill in the art would readily understand that modern routers are also programmable in both control and data planes. Programming (logical) interfaces can be multiplexed from one physical interface via configuration and then assigned to different logical routers. Virtual machine technology may also be used to manage server resources. To facilitate sharing connectivity, the physical devices 310 and 318 in each ShadowNet node 308 are connected via a configurable switching layer 316, which shares the local connectivity, for example using VLANs. The carrier-supporting-carrier capabilities enabled by Multiprotocol Label Switching ("MPLS") virtual private networks ("VPNs") offer strong isolation and are therefore an ideal choice to create the ShadowNet backbone.

As depicted in FIG. 3, central to ShadowNet functionality is the ShadowNet Controller 306. The Controller 306 facilitates the specification and instantiation of a service trial in the form of a slice owned by a user. The Controller 306 provides a programmatic access 322 to ShadowNet users 300, allowing them to create the topological setup of the intended service trial or deployment. Alternatively users 300 can access ShadowNet through a Web-based portal 302, which in turn will interact with the ShadowNet Controller via the User API 304. The ShadowNet Controller 306 keeps track of the physical devices 308, 310, 318 that make up each ShadowNet node 308 by constantly monitoring them, and further manages and manipulates those physical devices 308, 310, 318 to realize the user-level APIs, while maintaining a clean separation between the abstracted slice specifications and the way they are realized on the physical equipment. As would be readily understood by those of ordinary skill in the art, the user-level APIs 304 also enable users to dynamically interact with and manage the physical instantiation of the users' slices. Specifically, users 300 can directly access and configure each instantiated logical device.

ShadowNet allows a user to deactivate individual devices in a slice or the slice as a whole, by releasing the allocated physical resources 308, 310, 318. ShadowNet decouples the persistent state from the instantiated physical devices, so that the state change associated with a device in the specification is maintained even if the physical instantiation is released. Subsequently, the device in the specification can be re-instantiated (assuming that sufficient resources are available) and the saved state restored thereby leaving the user perceived slice intact. For example, the configuration change made by a user 300 to a logical router can be maintained and applied to a new instantiated logical router 310, even if the physical placement of the logical device is different.

Figure 4:
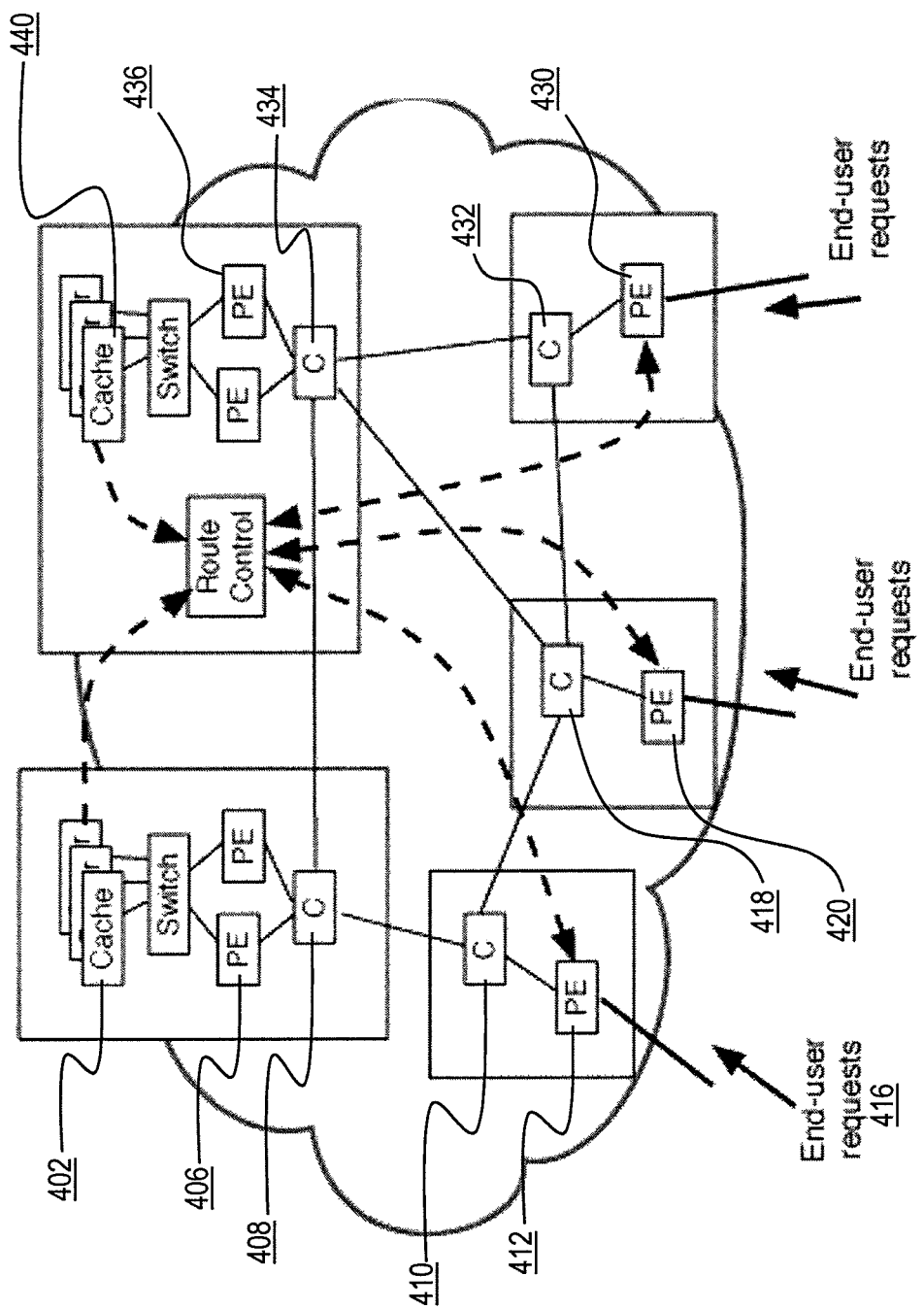
FIG. 4 shows how components of a content distribution network may be realized on the ShadowNet platform, according to an aspect of the present disclosure.

In non-limiting embodiments, ShadowNet may be used to run a customer trial of a load-aware anycast Content Distribution Network (CDN). FIG. 4 depicts how all the components of such a CDN can be realized on the ShadowNet platform. Specifically, a network, complete with provider edge (PE) 406, 412, 420, 430 and 436, and core routers 408, 410, 418, 432 and 434, can be dynamically instantiated to represent a small backbone network. Further, servers in a subset of the ShadowNet nodes can be allocated and configured to serve as content caches. A load-aware anycast CDN utilizes route control to inform BGP selection based on the cache load, i.e., using BGP, traffic can be steered away from overloaded cache servers. In ShadowNet, this BGP speaking route control entity can be instantiated on either a server or a router depending on the implementation. Appropriate configuration/implementation of BGP, flow-sampling, and server load monitoring complete the infrastructure picture. Finally, actual end-user requests can be directed to the ShadowNet infrastructure, e.g., by resolving a content URL to the anycast address(es) associated with and advertised by the CDN contained in the ShadowNet infrastructure.

In embodiments, several capabilities required of the ShadowNet infrastructure to enable such realistic service evaluation can be identified: (i) to gain confidence in the equipment used in the trial, the ShadowNet infrastructure should be the same as, or similar to, equipment used in the production network (production-grade devices); (ii) to thoroughly test load feedback mechanisms and traffic steering algorithms, the ShadowNet architecture requires participation of significant numbers of customers (realistic workloads); (iii) having significant numbers of customers, in turn, requires sufficient network capacity (high capacity backbone); (iv) realistic network and CDN functionality require realistic network latencies and geographic distribution (geographic coverage); (v) finally, the CDN control framework could dynamically adjust the resources allocated based on the offered load (dynamic reconfiguration).

In embodiments, ShadowNet is capable of dynamically changing slice specifications, thereby enabling machines for content caches and network links to be dynamically spawned or removed in response to increased or decreased client requests.

Additionally, ShadowNet is built upon a production ISP network having its own virtual backbone with bandwidth and latency guarantees, thereby pushing the tested service closer to the core of the ISP network where the actual production service would be deployed.

Figure 5:
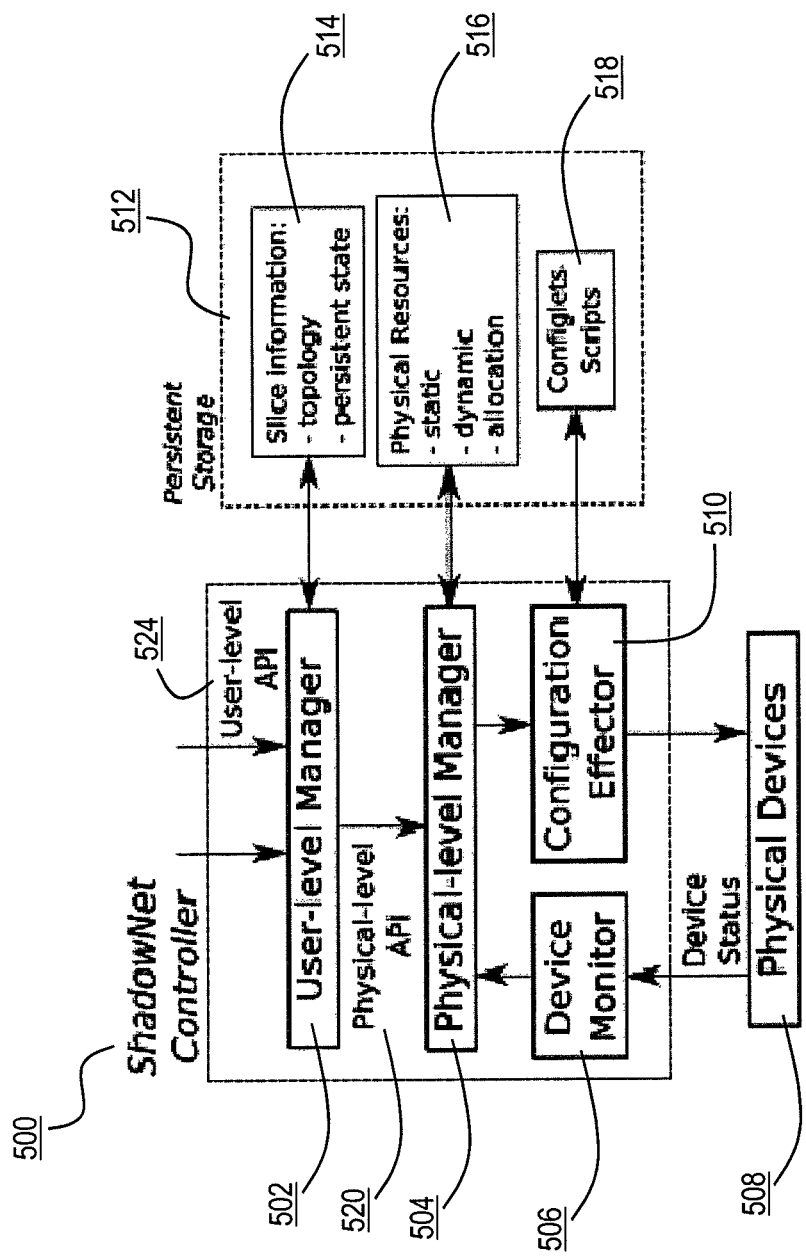
FIG. 5 shows a ShadowNet controller consisting of a user-level manager, a physical-level manager, a configuration effector and a device monitor, according to an aspect of the present disclosure.

In embodiments, the ShadowNet controller 500 consists of a user-level manager 502, a physical-level manager 504, a configuration effector 510 and a device monitor 506, as shown in FIG. 5. Each component is described below. In one particular non-limiting embodiment, the ShadowNet design utilizes a centralized controller that interacts with and controls all ShadowNet nodes.

In embodiments, the user-level manager 502 is designed to take the input of user-level API calls 524. Each API call 524 corresponds to an action that the users of ShadowNet are allowed to perform. A user can create a topological specification of a service trial, instantiate the specification to physical resources, interact with the allocated physical resources, and deactivate the slice when the test finishes. The topology specification of a slice 514 may stored by the user-level manager in persistent storage 512, so that the slice can be retrieved, revived and modified over time. The user-level manager also helps maintain and manage the saved persistent state from physical instantiations. By retrieving saved states and applying them to physical instantiations, advanced features, like device duplication, may be enabled.

The user-level manager is essentially a network service used to manipulate configurations of user experiments. The user-level manager may be accessed from within the experiment, facilitating network control in a closed-loop fashion. In the embodiment shown in FIG. 4, the route control component may dynamically add content caches 402, 440 when user demand is high by calling the user-level API 524 to add more computing and networking resources via the user-level manager 502.

In embodiments, the physical-level manager 504 fulfills requests from the user-level manager 502 in the form of physical-level API calls 520 by manipulating the physical resources 516 in ShadowNet. To fulfill the requests, the physical-level manager maintains three types of information: 1) "static" information, such as the devices in each ShadowNet node and the capabilities of those devices; 2) "dynamic" information, e.g., the online status of all devices and whether any interface modules are not functioning; and 3) "allocation" information, which is the up-to-date usage of the physical resources.

Static information is changed when new devices are added or old devices are removed. Dynamic information is constantly updated by the device monitor 506. The physical level manager 504 may configure physical devices to spawn virtualized device slivers for the instantiation of user-level devices and user-level connectivities, manage the states of these physical, and delete existing instantiated slivers. A sliver is a share of the physical resource, e.g., a virtual machine or a sliced physical link. The physical-level manager 504 may handle requests, such as creating a VM, by figuring out the physical device 508 to configure and how to configure it. The actual management actions may be performed via the configuration effector 510.

In non-limiting embodiments, the configuration effector 510 specializes in realizing configuration changes to physical devices 508. Configlets 518 are parameterized configuration or script templates, saved in the persistent storage 512 and retrieved on demand. To realize the physical-level API calls 520, the physical-level manager 504 may decide on the appropriate configlet 518 to use and generates parameters based on the request and the physical resource information 516. The configuration effector 510 executes the configuration change on target physical devices 508.

In further embodiments, a device monitor 506 actively or passively determines the status of physical devices 508 or components and propagates "dynamic" information to the physical-level manager 504. Effectively, the device monitor 508 detects any physical device failures in real time. As the physical-level manager 504 receives the update, it can perform appropriate actions to mitigate the failure and to minimize any inconsistency of physical instantiation and user specifications. Device or component recovery can be detected as well, and, as such, the recovered resource can again be considered usable by the physical-level manager 504.

Figure 6:
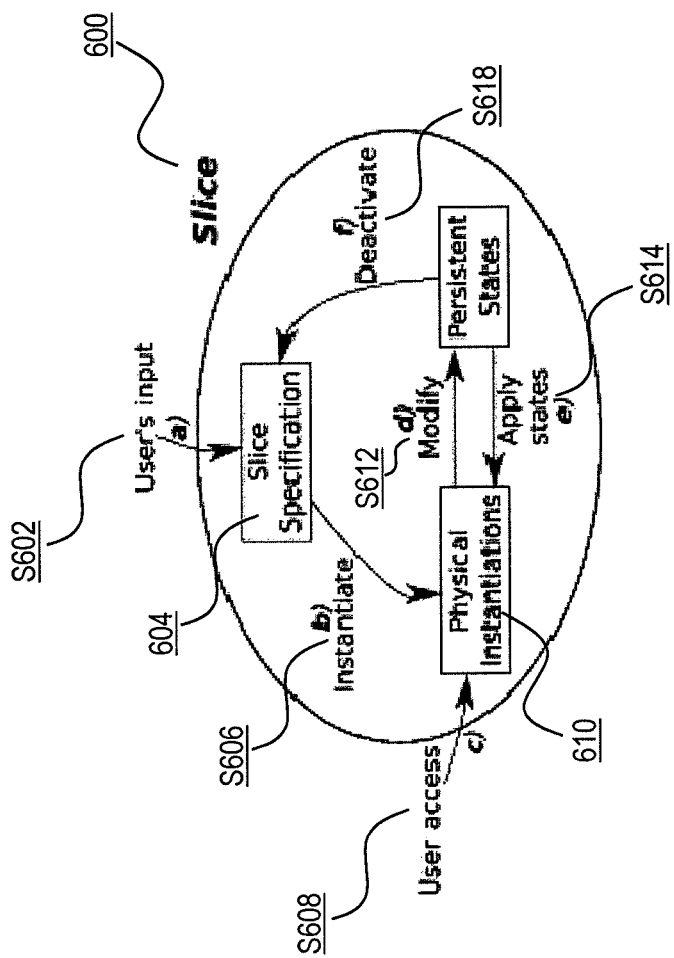
FIG. 6 shows three layers embedded in a slice and the interactions among these three layers, according to an aspect of the present disclosure.

The three layers embedded in a slice 600, and the interactions S606, S612, S614 and S618 among them, are depicted in FIG. 6. In embodiments, a user of ShadowNet may create a service topology in the form of a slice 600, which is manipulated through the user level API calls supported by the ShadowNet controller. This section outlines user-exposed functionalities that the APIs implement.

Figure 7:
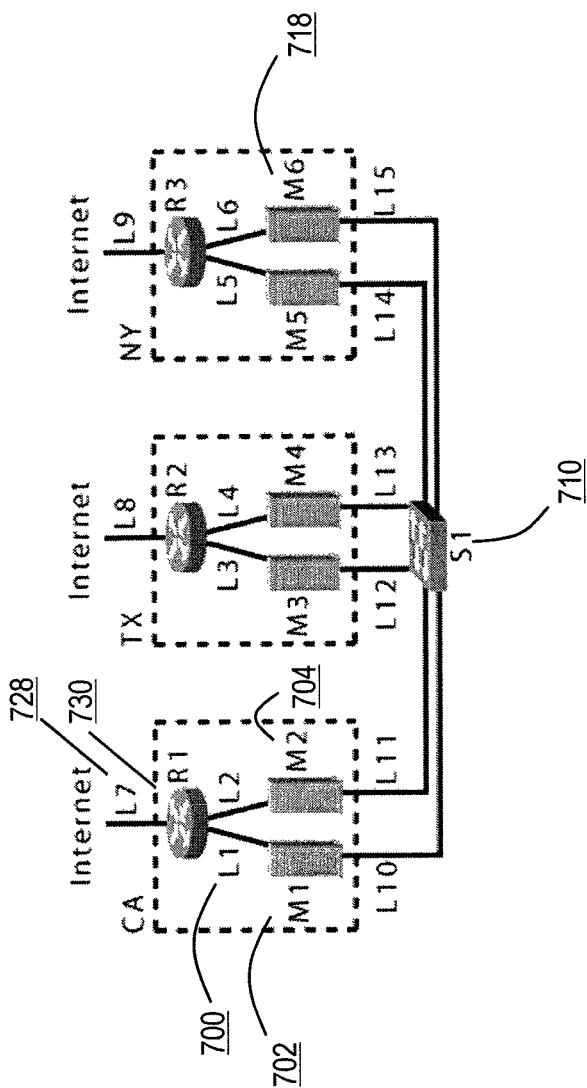
FIG. 7 depicts a topology of a slice and an Application Programming Interface ("API") call sequence that creates the slice, according to an aspect of the present disclosure.

To create a new service trial in non-limiting embodiments, an authorized user of ShadowNet may create a slice. As a basic support, the user specifies the topological setup through the user-level API S602 (a in FIG. 6). FIG. 7, for example, depicts one embodiment of a topology of a hypothetical slice and the API call sequence that creates it.

In embodiments, the slice 600 created acts like a placeholder for a collection of user-level objects, including devices and connectivities. Three generic types of user-level devices (UsrDevice) are supported: router (UsrRouter), machine (UsrMachine), and switch (UsrSwitch). Two UsrDevices can be connected to each other via a user-level link (UsrLink). User-level interfaces (UsrInt) can be added to a UsrDevice explicitly by the slice owner. In some cases, however, they may be created implicitly when a UsrLink is added to connect two UsrDevices.

A UsrMachine 702 represents a generic computing resource where the user can run service applications. A UsrRouter 730 may run routing protocols, forward and filter packets, etc. Further, UsrRouters are programmable, allowing for custom router functionality. A UsrLink 700 ensures that when the UsrDevice on one end sends a packet, the UsrDevice on the other end will receive it. A UsrSwitch 710 provides a single broadcast domain to the UsrDevices connecting to it. ShadowNet provides the capability and flexibility of putting geographically dispersed devices on the same broadcast domain. For example, UsrMachines, such as 702 and 718, although specified in different locations, are all connected to UsrSwitch 710. Besides internal connectivity among UsrDevices, ShadowNet can drive live Internet traffic to a service trial by allocating a public IP prefix for a user-level interface, Usrint, on a UsrDevice. For example, UsrLink 728 is used to connect UsrRouter 730 to the Internet, allocating an IP prefix of 141.212.111.0/24, as illustrated in FIG. 7.

Besides creating devices and links, a user of ShadowNet may also associate properties with different objects, e.g., the OS image of a UsrMachine and the IP addresses of the two interfaces on each side of a UsrLink. As a distributed infrastructure, ShadowNet allows users to specify location preference for each device as well, e.g., California for M1 702, M2 704 and R1 730. This location information is used by the physical layer manager when instantiation is performed.

As illustrated in FIG. 6, step b, represented by reference S606, one embodiment permits a user to instantiate some or all objects in the user's slice 600 onto physical resources. From this point on, the slice 600 not only contains the abstracted slice specification 604, but also has associated the physical resources to which the instantiated objects (i.e., physical instantiations 610) in the specification S606 are mapped.

ShadowNet provides a number of types of instantiation strategies. In one embodiment, a user may design a full specification for the slice and instantiate all the objects in the specification together. In a second embodiment, user-level objects in the specification may be instantiated upon request at any time. For example, the user-level objects can be dynamically instantiated as they are added to the service specification. Dynamically instantiating user-level objects is useful in situations requiring building a slice interactively and/or modifying the slice over time, e.g., extending the slice resources based on increased demand.

ShadowNet may also limit the number of shares (slivers) a physical resource provides, thereby simplifying the resource allocation problem to a straightforward availability check.

In embodiments, ShadowNet allows a user to access the physical instantiation of the UsrDevices and UsrLinks in the user's slice, e.g., logging into a router or tapping into a link, as shown in step c S608 in FIG. 6. This support may be necessary for a number of reasons. First, a user may want to install software on UsrMachines or UsrRouters and/or configure UsrRouters for forwarding and filtering packets. Second, purely from an operational point of view, operators may desire direct access to the devices (e.g., a terminal window on a server or command line access to a router).

In embodiments, for UsrMachines and UsrRouters, users may be permitted to log into the device and make any changes they want. For UsrLinks and UsrSwitches, packet dump feeds may be provided upon request. This support is crucial for service testing, debugging and optimization since such support can give the capability and flexibility of sniffing packets at any place within a service deployment without installing additional software on end-points.

Enabling device access may also enable users to change the persistent state of the physical instantiations, such as for example, files installed on disks and configuration changes on routers. In embodiments, ShadowNet decouples the persistent state from the physical instantiation. When the physical instantiation is modified, the changed state also becomes part of the slice, as shown in step d S612 in FIG. 6.

In embodiments, the instantiated user-level objects in the specification of a slice 600 may be deactivated, releasing the physical instantiations of the objects from the slice by giving them back to the ShadowNet infrastructure. For example, a user may choose to deactivate an under-utilized slice as a whole so that other users can test their slices when physical resources are scarce. While releasing the physical resource, the persistent state is extracted and stored as part of the slice, as shown in step f S618 in FIG. 6. As a result, when the user decides to revive a whole slice or an object in the slice, new physical resources may be acquired and the stored state may be associated with the object applied to it, as shown in step e S614 in FIG. 6. Operationally speaking, a user is able to deactivate a slice and reactivate it later, most likely (but not necessarily) on a different set of resources but still functioning like before.

Abstracting the persistent state from the physical instantiation enables other useful primitives in the context of service deployment. If, for example, a new UsrDevice is instantiated and the state of an existing UsrDevice is applied to it, the existing UsrDevice is effectively duplicated. In such an example, a user may instantiate a new UsrMachine with only the basic operating system ("OS") setup, log into the machine to install necessary application code, and configure the OS. With the support provided by ShadowNet, the user is then able to spawn several new UsrMachines and apply the state of the first machine. Spawning new UsrMachines and applying the state of the first machine eases the task of creating a cluster of devices serving similar purposes. From the ShadowNet control perspective, this separation allows sophisticated techniques to hide physical device failures. For example, if a physical router hosting numerous logical routers experiences a power failure, only new instantiations on other available devices of the same type need to be created before the states are applied to them. During the whole process, the slice specification, which is what the user perceives, remains intact.

In embodiments, the slice specification instantiation 604 may be performed by the ShadowNet controller in a fully automated fashion. The methods to instantiate on two types of resource are described as follows.

ShadowNet currently utilizes UsrMachines and UsrRouters. Each Virtual Machine ("VM") and logical router created is considered a device sliver. To instantiate a UsrRouter or a UsrMachine, a ShadowNet node is chosen based on the location property specified. Matching physical devices on the node are then enumerated for availability checking, i.e., whether a router is capable of spawning a new logical router. When there are multiple choices, usage may be distributed across devices in a round-robin fashion. Location preference may be unspecified, such as in situations where the instantiation of UsrDevice is immaterial to the user. Such situations may, but do not necessarily, include, for example, when the user is testing a router configuration option. In such a case, the ShadowNet node chosen is the one where that type of device is least utilized. When no available resource can be allocated, an error is returned.

The production network associated with ShadowNet provides both Internet connection and virtual backbone connectivity to each ShadowNet node. A logical router, called the head router of the ShadowNet node, may be configured to terminate these two connections. With the ShadowNet backbone connectivity provided by the ISP, all head routers form a full-mesh, serving as the core routers of ShadowNet. For Internet connectivity, the head router may interact with the ISP's border router, by, for example, announcing BGP routes.

Connecting device slivers on the same ShadowNet node can be handled by the switching layer of that node. The head routers are used when device slivers across nodes need to be connected. ShadowNet makes use of Carrier-Supporting-Carrier (CsC) capabilities provided by MPLS-enabled networks. CsC utilizes the VPN service provided by the ISP, and stacks on top of it another layer of VPN services, running in parallel with, but isolated from, each other. For example, layer-2 VPNs (so called pseudo-wire) and Virtual Private Local Area Network Service ("VPLS") VPNs can be stacked on top of a layer-3 VPN service.

The approach described in this disclosure has a number of key benefits. First, each layer-2 VPN or VPLS instance encapsulates the network traffic within the instance, thus providing strong isolation across links. Second, the approach of this disclosure offers off-the-shelf production-grade services, which are much more efficient than manually configured tunnels. Third, the approach of this disclosure is more realistic for users because there is no additional configuration needed in the logical routers they use. The layer-2 VPN and VPLS options heavily used in ShadowNet provide layer-2 connectivity. In other words, with router programmability, any layer-3 protocol besides IP can run on top of it.

Figure 8:
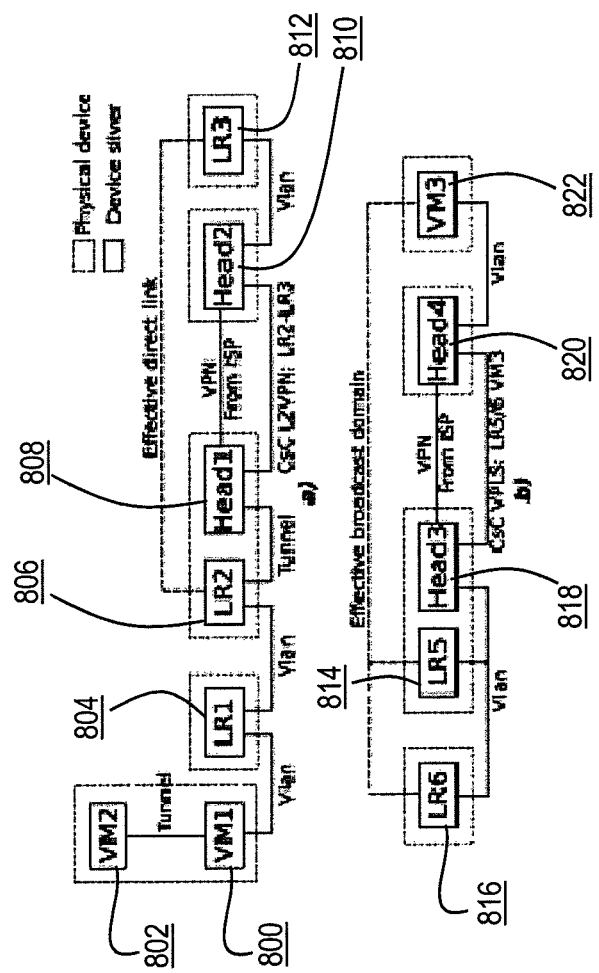
FIG. 8 shows examples of enabling connectivity, according to an aspect of the present disclosure.

FIG. 8 illustrates various examples for enabling connectivity.

UsrLink: To instantiate a UsrLink, the instantiations of the two UsrDevices on the two ends of the UsrLink are first identified. FIG. 8a shows three cases.

1) Two slivers are on the same physical device. For example, VM1 800 and VM2 802 are on the same server; LR2 806 and Head1 808 are on the same router. In this case in which two slivers are on the same physical device, local bridging is used to realize the UsrLink.

2) Two slivers are on the same ShadowNet node, but not the same device. For example, VM1 800 and LR1 804, LR1 804 and LR2 806. A dedicated VLAN on that node is used for each UsrLink of this type in which two slivers are on the same ShadowNet node, but not on the same device, e.g., LR1 804 will be configured with two interfaces, joining two different VLAN segments, one for the link to VM1 800 and the other one to LR2 806.

3) Two slivers are on different nodes. For example, LR2 806 and LR3 812. In this case in which two slivers are on different nodes, each sliver is first connected to its local head router (808 and 810, respectively) using the two methods described above. Then the head router creates a layer-2 VPN to bridge the added interfaces, effectively creating a cross-node tunnel connecting the two slivers.

In each scenario above, the types of the physical interfaces that should be used to enable the link are decided, the selected physical interfaces are configured, and the resource usage information of the interfaces is updated.

Those having ordinary skill in the art would readily understand that MPLS-VPN technologies achieve much higher levels of realism over software tunnels because almost no configuration is required at the end-points that are being connected. Accordingly, to enable the direct link between LR2 806 and LR3 812, the layer-2 VPN configuration only happens on Head1 808 and Head2 810. As a result, if the user logs into the logical router LR2 806 after its creation, the user would only see a "physical" interface setup in the configuration, even without IP configured, yet that interface leads to LR3 812 according to the layer-2 topology.

User-view switches: FIG. 8(b) shows virtual machines VM1 800 and VM2 802, logic routers LR1 804, LR2 806 and LR3 812, and head nodes Head1 808 and Head2 810. Unlike for UsrMachines and UsrRouters, ShadowNet does not allocate user-controllable device slivers for the instantiation of UsrSwitches, but rather provides an Ethernet broadcasting medium.

Referring to FIG. 8(b), to instantiate a UsrSwitch connecting to a set of UsrDevices instantiated on the same ShadowNet node, a dedicated VLAN-ID on that node is allocated and those device slivers are configured to join the VLAN (i.e., LR5 814 and LR6 816). If the device slivers mapped to the UsrDevices distribute across different ShadowNet nodes, the slivers are first recursively bridged on the same node using VLANs, and then one VPLS-VPN instance on each head router (i.e., Head3 818 and Head4 820) is configured to bridge all those VLANs. Recursively bridging and then configuring each head router in this way puts all those device slivers (i.e., VM3 822, LR5 814, LR6 816) onto the same broadcast domain, thereby achieving a high degree of realism. For example on LR5 814 and LR6 816, the instantiated logical router only shows one "physical" interface in its configuration.

Internet access: It is assumed that ShadowNet nodes can use a set of prefixes to communicate with any end-points on the Internet. The prefixes can either be announced through BGP sessions configured on the head routers to the ISP's border routers, or statically configured on the border routers.

To instantiate a UsrDevice's Internet connectivity, the UsrDevice's instantiation is first connected to the head router on the same node. Then the head router is configured so that the allocated prefix is correctly forwarded to the UsrDevice over the established link and the route for the prefix is announced via BGP to the ISP. For example, a user specifies two UsrRouters connecting to the Internet, allocating them with prefix 136.12.0.0/24 and 136.12.1.0/24. The head router should in turn announce an aggregated prefix 136.12.0.0/23 to the ISP border router.

As a shared infrastructure for many users, ShadowNet attempts to minimize the interference among the physical instantiation of different slices. Each virtual machine is allocated with its own memory address space, disk image, and network interfaces. However, some resources, like the CPU, for example, are shared among virtual machines, so that one virtual machine could potentially drain most of the CPU cycles.

Those having ordinary skill in the art would readily understand that a logical router has its own configuration file and maintains its own routing table and forwarding table. However, control plane resources, such as CPU and memory are shared among logical routers.

The isolation of packets among different UsrLinks is guaranteed by the physical device and routing protocol properties. Router support is leveraged for packet filtering and shaping to prevent IP spoofing and bandwidth abusing. The corresponding configuration is made on head routers, where end-users cannot access. For each UsrLink, a default rate-limit (e.g., 10 Mbps), which can be upgraded by sending a request via the userlevel API, is imposed. Rate limiting is achieved via hardware traffic policers and Linux kernel support.

Console or remote-desktop access: For each VM running on VirtualBox, a port is specified on the hosting server to enable Remote Desktop protocol for graphical access restricted to that VM. If the user prefers command line access, a serial port console in the VM images is enabled and mapped to a UNIX domain socket on the hosting machine's file system. On a physical router, each logical router can be configured to be accessible through Secure Shell ("SSH") using a given username and password pair, while confining the access to be within the logical router only.

Though the device slivers of a slice can be connected to the Internet, the management interface of the actual physical devices in ShadowNet should not be. For example, the IP address of a physical server should be contained within ShadowNet rather than accessible globally. By having the IP address of a physical server contained within ShadowNet, users are able to access the device slivers through one level of indirection via the ShadowNet controller.

Sniffing links. To provide packet traces from a particular UsrLink or UsrSwitch, a SPAN port on the switching layer of a ShadowNet node is dynamically configured so that a dedicated server or a pre-configured VM can sniff the VLAN segment that the UsrLink or UsrSwitch is using. The packet trace can be redirected through the controller to the user in a streaming fashion or saved as a file for future downloading.

There are cases where no VLAN is used, e.g., for two logical routers on the same physical router connected via logical tunnel interfaces. In this case, the tunnel interfaces are deactivated and the UsrLink is reinstantiated using VLAN setup to support packet capture. This deactivating and re-instantiating action, however, happens at the physical-level and is thus transparent to the user-level, as the slice specification remains intact.

To extract the state of an instantiated UsrMachine, which essentially is a VM, the hard drive image of the virtual machine is maintained. The configuration file of a logical router is considered as the persistent state of the corresponding UsrRouter. Reviving stored state or a UsrMachine can be done by attaching the saved disk image to a newly instantiated VM. On the other hand, UsrRouter state, i.e., router configuration files, needs additional processing. For example, a user-level interface may be instantiated as interface fe-0/1/0.2 and thus appears in the configuration of the instantiated logical router. When the slice is deactivated and instantiated again, the Usrint may be mapped to a different interface, say ge-0/2/0.1. To deal with this complication of the Usrint being mapped to a different interface, the retrieved configuration is normalized and physical-dependent information is replaced with user-level object handles, which is then saved as the state.

Unexpected physical device failures can occur, and, in embodiments, ShadowNet tries to mitigate failures as quickly as possible to reduce user perceived down time. One benefit of separating the states from the physical instantiation is that a new physical instantiation can be replaced with the saved state applied without affecting user perception. Once a device or a physical component is determined to be offline, the ShadowNet controller identifies all instantiated user-level devices associated to it. New instantiations are created on healthy physical devices and saved states are applied if possible. Note that certain users are specifically interested in observing service behavior during failure scenarios. Users are allowed to specify whether they want physical failures to pass through, which disables the failure mitigation functionality. On the other hand, failure can be injected by the ShadowNet user-level API, for example tearing down the physical instantiation of a link or a device in the specification to mimic a physical link-down event.

For physical routers, the device monitor performs periodic retrieval of the current configuration files, preserving the states of UsrRouters more proactively. When a whole physical router fails, the controller creates new logical routers with connectivity satisfying the topology on other healthy routers and applies the saved configuration, such as BGP setup. If an interface module fails, the other healthy interfaces on the same router are used instead. Note that the head router is managed in the same way as other logical routers, so the ShadowNet can also recover from router failures where head routers are down.

A physical machine failure can be catastrophic because recovering files from a failed machine can be challenging and particularly infeasible in the case of duplicating large files, such as VM images, to the controller. One potential solution is to deploy a distributed file system among the physical machines within one ShadowNet node.

In this section, one non-limiting embodiment representing a prototype implementation of the ShadowNet infrastructure, including the hardware setup and management controller, is briefly described. To evaluate the architecture, two Shadow-Net nodes are built and deployed locally.

In embodiments, each prototype node has two routers, one switch, and four servers. The routers are equipped with one or two PICs (Physical Interface Cards), Fast Ethernet PIC, and tunneling capability. Each server has two Ethernet interfaces and a virtualization package is used to host the virtual machines. The switch is capable of configuring VLANs and enabling SPAN ports.

In the local deployment, two routers act as an ISP backbone. MPLS is enabled on the routers to provide layer-3 VPN service as the ShadowNet backbone. BGP sessions are established between the head router of each node and its adjacent router, enabling external traffic to flow into ShadowNet. The network management interface fxp0 of the routers and one of the two Ethernet interfaces are connected to a dedicated and separate management switch. These interfaces are configured with private IP addresses, and used for physical device management only, thereby mimicking the out-of-band access which is common in ISP network management.

In embodiments, the ShadowNet controller runs on a dedicated machine, sitting on the management switch. In embodiments, the controller may be implemented in Perl. A Perl module, with all the user-level APIs, can be imported in Perl scripts to create, instantiate and access service specifications, similar to the code shown in FIG. 7. In embodiments, a mysql database runs on the same machine as the controller, serving largely, though not entirely, as the persistent storage connecting to the controller. The database stores physical device information, user specifications, and normalized configuration files, etc. In embodiments, a different set of tables is used to maintain physical-level information, e.g., phy_device_table, and user-level information, e.g., usr_$link$_table. The Perl module retrieves information from the tables and updates the tables when fulfilling API calls.

In non-limiting embodiments, the configuration effector of the ShadowNet controller is implemented within the Perl module as well. The NetConf XML API exposed by the routers may be used to configure and control them. Configlets in the form of parametrized XML files may be stored on the controller. The controller may periodically retrieve the configuration of the physical router in XML format and when UsrRouters are deactivated. In embodiments, a specialized XML parser may be used to extract individual logical router configurations and normalize relative fields, such as interface-related configurations. The normalized configurations may be serialized in text format and stored in the mysql database associating to the specific UsrRouter.

Shell and Perl scripts, which wrap the virtualization software package management interface, may be executed on the hosting servers to automatically create VMs, snapshot running VMs, and stop or destroy VMs. In embodiments, the configuration effector may be configured to log into each hosting server and execute those scripts with the correct parameters. On the servers, low-priority cron jobs may be executed to maintain a fair amount of default VM images of different OS types. In this case, the request of creating a new VM can be fulfilled fairly quickly, amortizing the overhead across time. In embodiments, the following steps may be used to direct the traffic of an interface used by a VM to a particular VLAN. First, tunctl is run on the hosting server to create a tap interface, which is configured in the VMM to be the "physical" interface of the VM. Second, 802.1 Q kernel module is used to create VLAN interfaces on the hosting server, like eth1.4, which participates in VLAN4. Finally brctl is used to bridge the created tap interface and VLAN interface.

Instead of effecting one configuration change per action, the changes to the physical devices may be batched and executed once per device, thus reducing authentication and committing overheads. Additionally, all devices may be manipulated in parallel.

In embodiments, the device monitor module may run as a daemon on the controller machine. SNMP trap messages may be enabled on the routers and sent over the management channel to the controller machine. Ping messages may be sent periodically to all devices. The two sources of information may be processed in the background by the monitoring daemon. When failures are detected, the monitoring module may call the physical-level APIs in the Perl module, which in response may populate configlets, and execute on the routers to handle failures. An error message may also be automatically sent to the administrators.

In this section, various aspects of ShadowNet are evaluated based on two example slices instantiated on one embodiments of the presently claimed invention. The user specifications in one non-limiting embodiment are illustrated on the left side of FIG. 9; the physical realization of that specification is on the right. In Slice1, two locations are specified, namely LA and NY. On the LA side, one UsrMachine (M1) and one UsrRouter (R1) are specified. R1 is connected to M1 through a UsrLink. R1 is connected to the Internet through L2 and to R2 directly via L5. The setup is similar on NY side. To enable the correct forwarding between M1 and M2, minimum IP and OSPF configuration is used. Slice2 has essentially the same setup, except that the two UsrRouters do not have Internet access.

Figure 9:
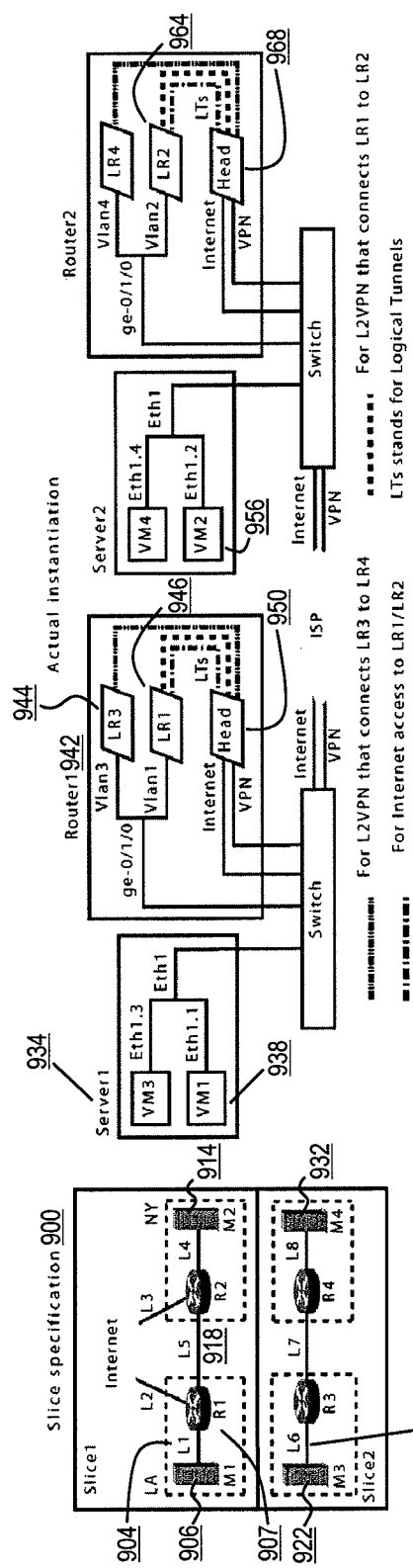
FIG. 9 shows user specifications illustrated on the left side and physical realization of those user specifications on the right, according to an aspect of the present disclosure.

FIG. 9 shows a slice specification 900 and the instantiation of two slices in one embodiment. Virtual machine VM1 938 and logical router LR1 946 are the instantiation of M1 906 and R1 907 respectively. UsrLink L1 904 is instantiated as a dedicated channel formed by virtualized interfaces from physical interfaces, eth1 and ge-0/1/0, and configured to participate in the same VLAN. To create the UsrLink L5 918, ShadowNet first uses logical tunnel interfaces to connect LR1 946 and LR2 964 with these devices' head routers 950 and 968, respectively, which in turn bridge the programming (logical) interfaces using layer-2 VPN.

Using one approach, the ShadowNet controller spends 82 seconds on the physical routers alone by making 13 changes, resulting in a 94-second execution time in total. For machine configuration, two scripts are executed for creating the virtual machines, and two for configuring the link connectivity. With the two simple optimization heuristics described earlier, the total execution time is reduced to 7.4 seconds. The router and machine configurations are also parallelized, to yield a total equal to DB+max(Router$_i$, Machine$_j$). Parallelization ensures that the total time to create a slice does not increase linearly with the size of the slice. It is estimated that the creation time for most slices is within 10 seconds.

Various stress tests are performed to examine ShadowNet's capability and fidelity. In one non-limiting embodiment, L5 918 is made the bottleneck link and different link constraints are set using the router's traffic policer. The observed bandwidth that M1 906 and M2 914 can achieve on the link is tested by sending packets as fast as possible. Packets are dropped from the head of the queue. The results demonstrate that ShadowNet can closely mimic different link capacities.

When no constraint is placed on L5 918, the throughput achieved is around 94.8 Mbps, which is close to maximum because the routers used as ISP cores are equipped with Fast Ethernet interfaces, which have a 100 Mbps capacity, and the VM is specified with 100 Mbps virtual interface. Physical gigabit switches are usually not the bottleneck, since two physical machines on the same physical machines connected via VLAN switch can achieve approximately 1 Gbps bandwidth.

Because evaluation is performed on a local testbed, the jitter and loss rate is almost zero, while the delay is relatively constant.

To understand the impact of a stressed control plane on other logical routers, software routers are run on both M1 906 and M3 922. In embodiments, the two software routers may be configured to peer with the BGP processes on LR1 946 and LR3 944. The software routers may be loaded with BGP routing tables of different sizes, transferred to LR1 946 and LR3 944. The BGP event log on the physical router may then be analyzed by measuring the duration from the first BGP update message to the time when all received routes have been processed.

Figure 10A:
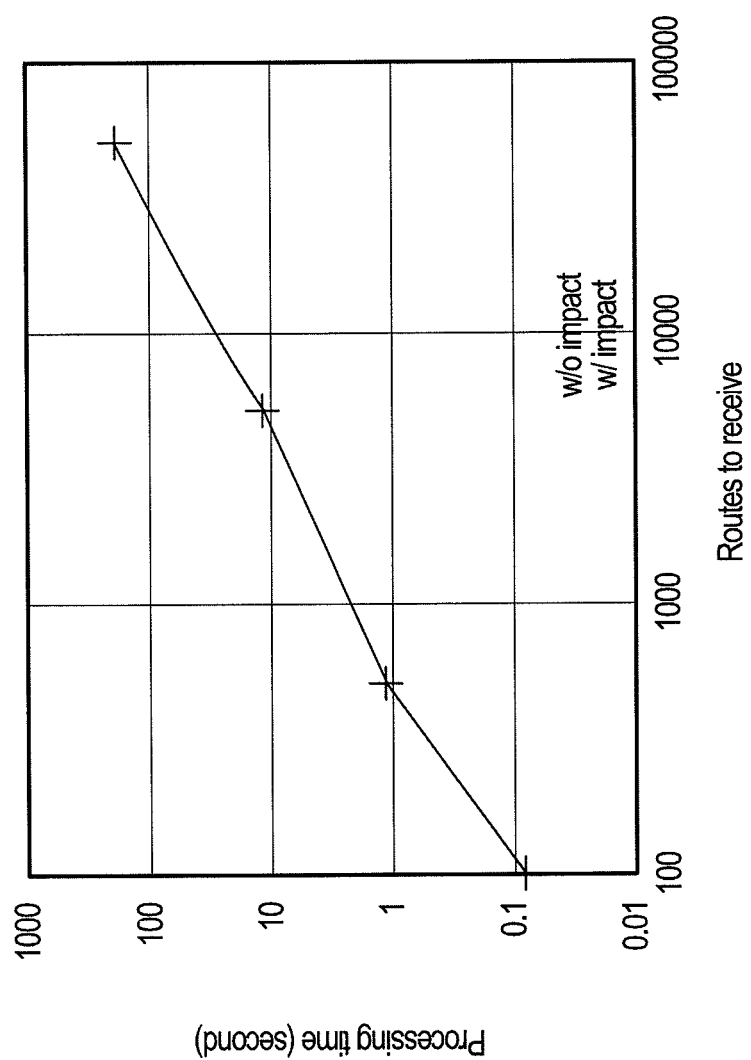
FIG. 10(a) shows control plane isolation test results, according to an aspect of the present disclosure.
Figure 10B:
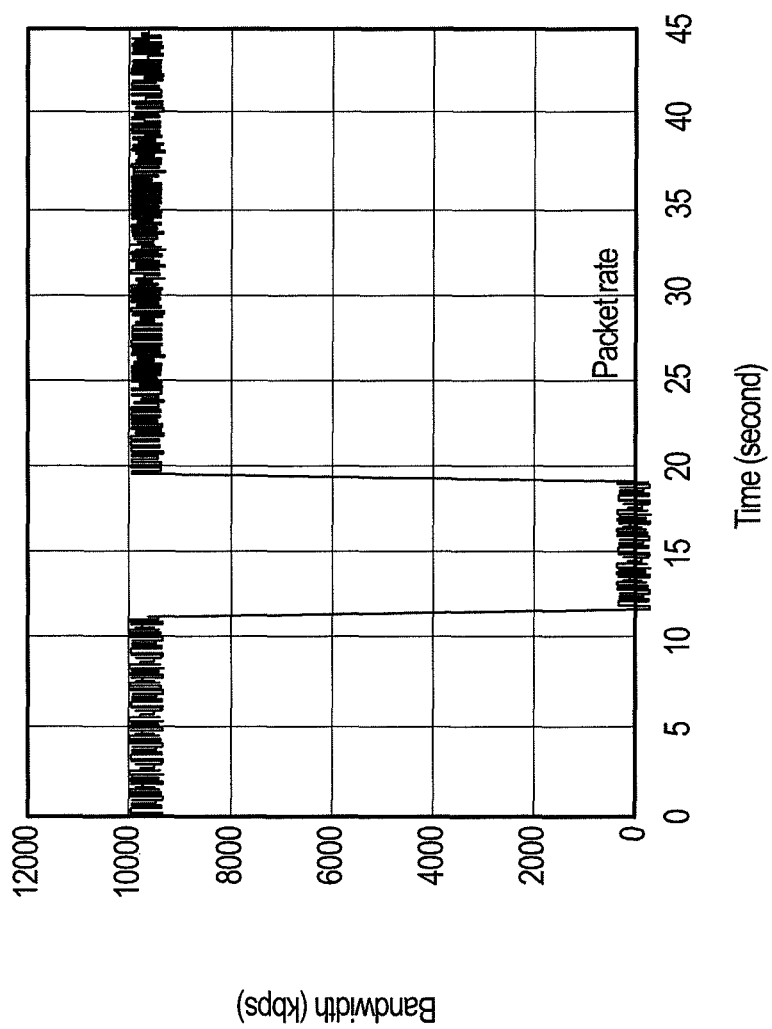
FIG. 10(b) shows hardware failure recovery test results, according to an aspect of the present disclosure.

In FIG. 10(*a*), the bottom line shows the processing time of the BGP process on LR1 946 to process all the routes if LR3 944 is BGP-inactive. The top line shows the processing time for LR1 946 when LR3 944 is also actively processing the BGP message stream. Both processing times increase linearly with the number of routes received. As can be seen in FIG. 10(*a*), the two lines are almost parallel, signifying that the delay is proportional to the original processing time. The difference of receiving 10 k routes is about 13 seconds, 73 seconds for 50 k routes. CPU usage is 100% even if only LR1 946 is BGP-active. Two physical machines are also used to peer with LR1 946 and LR3 944 to confirm that the bottleneck is due to the router control processor.

In non-limiting embodiments, L1 904 and L6 924 share the same physical interfaces, eth1 on Server1 934, and ge-0/1/0 on Router1 942. The bandwidth usage of both L1 904 and L6 924 are restricted to 1 Mbps by applying traffic policer on the ingress interfaces on LR1 946 and LR3 944. From the perspective of a given UsrLink, say, L1 904, two aspects are evaluated regardless of the amount of traffic sent on L6 924: (1.) L1 904 can always achieve the maximum bandwidth allocated (e.g., 1 Mbps given a 100 Mbps interface); and (2.) L1 904 can always obtain its fair share of the link. A traffic policer is applied on the ingress interfaces (ge-0/1/0) on LR1 946 and LR3 944, restricting the bandwidth of L1 904 and L6 924 to 1 Mbps. Simultaneous traffic is sent from M1 906 via L1 904 to M2 914, and from M3 922 via L6 924 to M4 932.

Figure 11A:
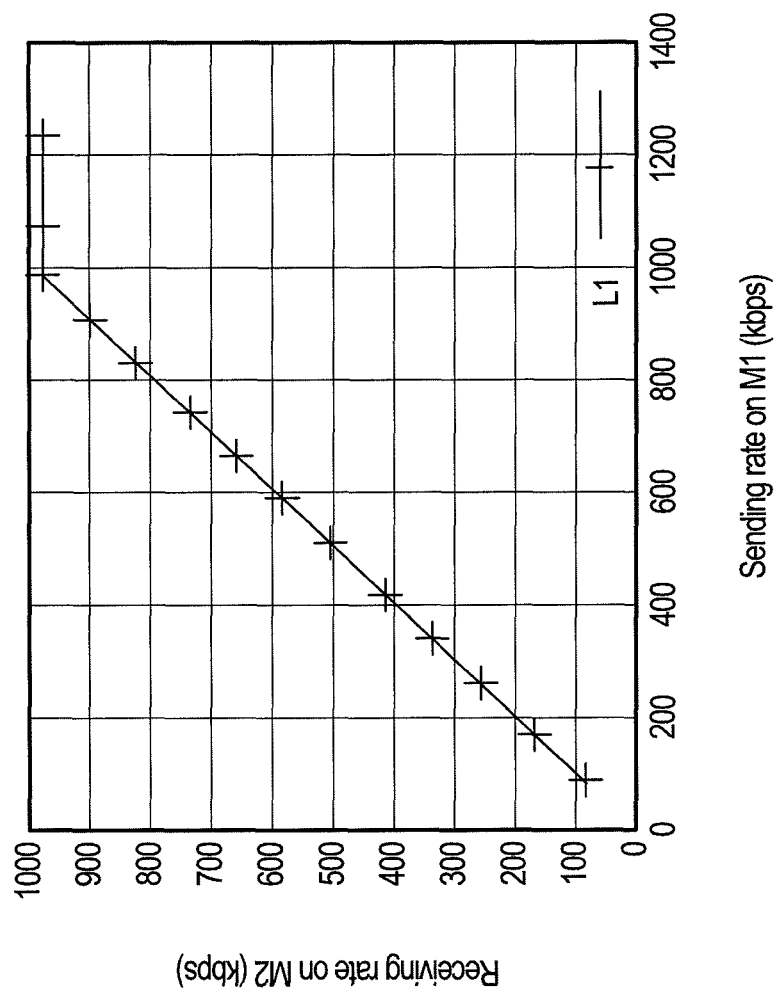
FIG. 11(a) shows data plane isolation test results illustrating a variable packet rate where L6's rate is maximized, according to an aspect of the present disclosure.
Figure 11B:
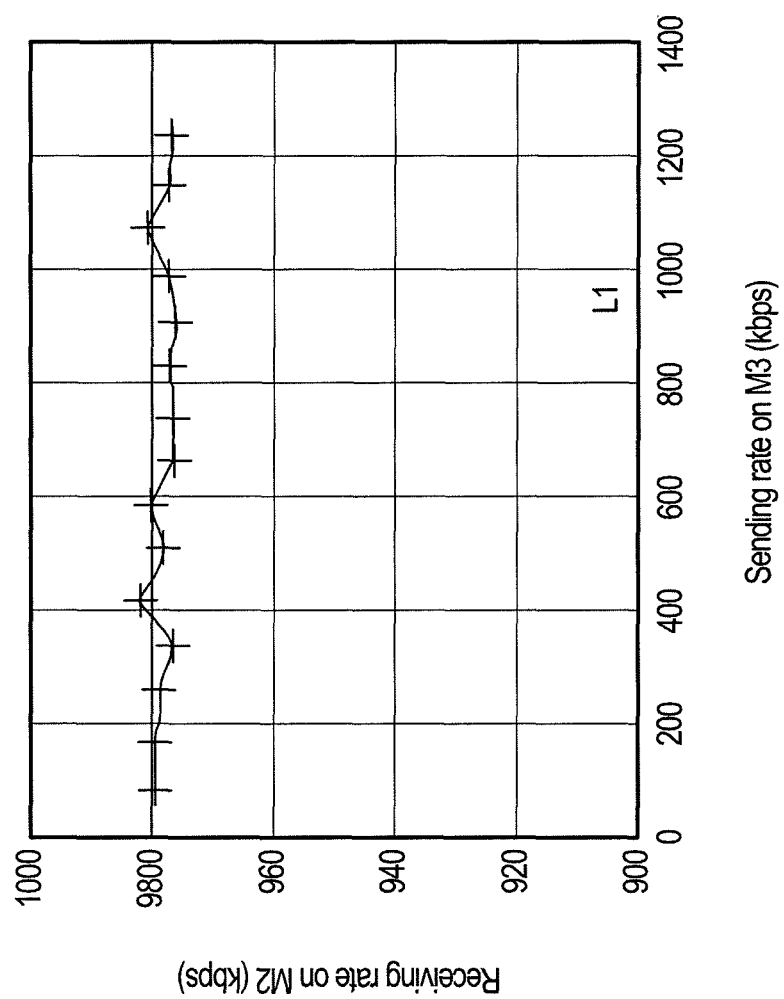
FIG. 11(b) shows data plane isolation test results illustrating the maximum packet rate where L6's rate is variable, according to an aspect of the present disclosure.

FIG. 11(*a*) shows the observed receiving rate on M2 914 on the y-axis as the sending rate of M1 906, shown on the x-axis, increases, while M3 922 is sending as fast as possible. The receiving rate matches closely with the sending rate, before reaching the imposed 1 Mbps limit. The close match between the receiving rate and the sending rate demonstrates that L1 904 capacity is not affected, even if L6 924 is maxed out. FIG. 11(*b*) shows that the maximum rate that L1 904 can achieve is always around 980 kbps no matter how fast M2 914 is sending.

The recovery time in response to a hardware failure in ShadowNet is evaluated. While Slice1 is running, M1 906 continuously sends packets to M2 914 via L1 904. The Ethernet cable on the Ethernet module ge-0/1/0 is physically disconnected, triggering SNMP LinkDown trap message and the subsequent reconfiguration activity. A separate interface (not shown in the figure) is found to be usable, then automatically configured to resurrect the down links. FIG. 10(*b*) shows the packet rate that M2 914 observes. The downtime is about 7.7 seconds, mostly spent on effecting router configuration change. Failure detection is fast due to continuous SNMP messages, and similarly controller processing takes less than 100 ms. The short downtime and controller processing times exemplifies the benefit of strong isolation in ShadowNet, as the physical instantiation is dynamically replaced using the previous IP and OSPF configuration, leaving the user-perceived slice intact after a short interruption. To further reduce the recovery time, the ShadowNet controller can spread a UsrLink's instantiation onto multiple physical interfaces, each of which provides a portion of the bandwidth independently.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission, such as for example VoIP, DDoS, BGP and MPLS, represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

What is claimed is:

1. A controller for providing a sharable, programmable and composable infrastructure, the controller comprising:
    a memory that stores executable instructions; and
    a processor that executes the executable instructions,
    wherein the controller takes input of user application programming interface calls that correspond to actions accepted from users;
    wherein the controller fulfills requests by manipulating distributed physical resources and logical devices in a network controlled by the controller;
    wherein the controller implements configuration changes to the physical resources and logical devices;
    wherein the controller monitors to determine a status of the physical resources and logical devices, propagates the status for detection of a failure of the physical resources and logical devices in real-time, and mitigates the failure; and
    wherein the controller enables a trial and a deployment of a new network service.

2. The controller of claim 1, wherein programming interfaces are multiplexed from one physical interface and physical resources and logical devices assigned to the programming interfaces.

3. The controller of claim 1, wherein the physical resources and logical devices in one node are computer resources comprising one of a machine and a virtual machine.

4. The controller of claim 1,
    wherein the physical resources and logical devices in one node are network resources comprising one of a router, a switch, a logical router and a logical switch.

5. The controller of claim 1,
    wherein the physical resources and logical devices in one node are link resources comprising one of a tunnel, a logical link and a virtual local area network.

6. The controller of claim 1,
    wherein the physical resources and logical devices in one node are connected via a configurable switching layer, which shares a local connectivity.

7. The controller of claim 1,
    wherein the physical resources and logical devices that make up a service design container are managed one of collectively and individually.

8. The controller of claim 7,
    wherein the service design container is stored in persistent storage and may be modified over time.

9. The controller of claim 1,
    wherein the controller maintains dynamic information relating to the status of the physical resources and logical devices and determines whether any of the physical resources and logical devices are not functioning.

10. A method for providing a sharable, programmable and composable infrastructure using a controller, the method comprising:
    taking input of user application programming interface calls that correspond to actions accepted from users;
    fulfilling requests by manipulating distributed physical resources and logical devices in a network controlled by the controller;
    implementing configuration changes, with a processor, to the physical resources and logical devices; and
    determining a status of the physical resources and logical devices, propagating the status for detection of a failure of the physical resources and logical devices in real-time, and mitigating the failure,
    wherein the controller enables a trial and a deployment of a new network service.

11. The method of claim 10, further comprising:
    instantiating an object in a service design container onto the physical resources and the logical devices;
    accessing a physical instantiation of physical resources and logical devices and links in the service design container;

deactivating any number of the instantiated objects in the service design container in order to release the physical instantiations of the instantiated objects from the service design container; and specifying a topology setup of the service design container or one of property assignment and instantiation.

12. The method of claim 11,
wherein the objects in the specification are instantiated one of together and upon request at any time.

13. The method of claim 11,
wherein the accessing further comprises logging into any number of devices and tapping into any number of links in order to change a persistent state of the physical instantiations.

14. The method of claim 11,
wherein the deactivating gives back the physical instantiations of the objects to the network.

15. The method of claim 14, further comprising:
extracting and storing as part of the service design container a persistent state of the physical resources and logical devices that has been deactivated, wherein the extracted and stored persistent state is available to be applied to new physical resources and logical devices in one of a revived service design container and an object in the service design container.

16. The method of claim 10,
wherein the taking input further comprises allowing the user to specify a topological setup through a user application programming interface.

17. A non-transitory computer readable storage medium encoded with an executable computer program for providing a sharable, programmable and composable infrastructure using a controller and that, when executed by a processor, causes the processor to perform operations comprising:

taking input of user application programming interface calls that correspond to actions accepted from users;

fulfilling requests by manipulating distributed physical resources and logical devices in a network controlled by a controller;

implementing configuration changes to the physical resources and logical devices; and determining a status of the physical resources and logical devices, propagating the status for detection of a failure of the physical resources and logical devices in real-time, and mitigating the failure, wherein the controller enables a trial and a deployment of a new network service.

18. The non-transitory computer readable storage medium of claim 17,
wherein two physical resource shares are on the same physical resource.

19. The non-transitory computer readable storage medium of claim 17,
wherein two physical resource shares are on a same network node.

20. The non-transitory computer readable storage medium of claim 17,
wherein two physical resource shares are on different network nodes.

* * * * *